United States Patent
Laor et al.

(10) Patent No.: US 6,424,649 B1
(45) Date of Patent: Jul. 23, 2002

(54) SYNCHRONOUS PIPELINED SWITCH USING SERIAL TRANSMISSION

(75) Inventors: Michael Laor, Zichron (IL); Garry P. Epps, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/001,270

(22) Filed: Dec. 31, 1997

(51) Int. Cl.[7] ............................................. H04L 12/56
(52) U.S. Cl. .................. 370/359; 370/360; 370/366; 370/386; 370/425
(58) Field of Search ................ 370/366, 370, 370/386, 395, 398, 360, 359, 419, 422, 423, 425, 503, 427

(56) References Cited

U.S. PATENT DOCUMENTS

| | | | |
|---|---|---|---|
| 4,064,360 A | * 12/1977 | Koenig | 178/3 |
| 4,979,118 A | 12/1990 | Kheradpir | 364/436 |
| 5,309,437 A | 5/1994 | Perlman et al. | 730/85.13 |
| 5,377,181 A | * 12/1994 | Rogers | 370/366 |
| 5,440,550 A | * 8/1995 | Follett | 370/427 |
| 5,519,858 A | 5/1996 | Walton et al. | 395/600 |
| 5,631,908 A | 5/1997 | Saxe | |
| 5,687,324 A | 11/1997 | Green et al. | |
| 5,724,351 A | 3/1998 | Chao et al. | |
| 5,754,547 A | 5/1998 | Nakazawa | |
| 5,774,698 A | * 6/1998 | Olnowich | 712/1 |
| 5,854,903 A | 12/1998 | Morrison et al. | |
| 5,892,924 A | 4/1999 | Lyon et al. | 395/200.75 |
| 5,898,686 A | 4/1999 | Virgile | |

* cited by examiner

Primary Examiner—Min Jung
(74) Attorney, Agent, or Firm—Cesari and McKenna, LLP

(57) ABSTRACT

The invention provides a method and system for operating a switch, in which incoming data cells are converted from parallel to serial for synchronous input to a switch interconnect, converted from serial to parallel for parallel switching, converted from parallel to serial for synchronous output from the switch interconnect, and converted from serial to parallel for output. The switch interconnect and its input and output interfaces are controlled by a single frequency source, so that all serial data communication paths into and out of the switch interconnect are phase synchronized to within one clock cycle. A single frequency source for the switch system is coupled to the input interfaces, to output interfaces, and to the switch interconnect. The input interfaces each include a PLL which synchronizes to the single frequency source once for all serial communication to the switch interconnect. The switch interconnect includes one PLL for each input interface which synchronizes to the serial input from that input interface, and one PLL for each output interface which synchronizes to the single frequency source once for all serial communication to the output interface. Similarly, the output interfaces each include a PLL which synchronizes to the serial output from the switch interconnect. The switch interconnect is coupled to the single frequency source and operates in phase therewith.

11 Claims, 3 Drawing Sheets

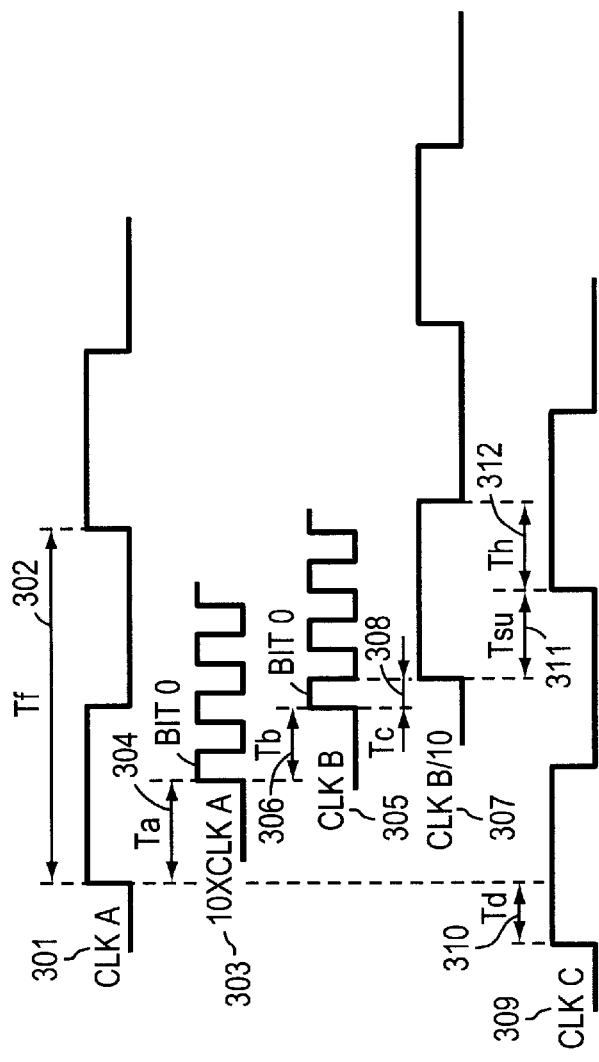

Ta = THE TIME FROM LATCHING THE DATA TO THE TRANSMITTER PARALLEL INTERFACE UNTIL THE FIRST BIT OF THE 10 BITS IS SENT OUT.
Tb = THE RELIEVER DATA CLK D. THIS DELTA INCLUDES THE FLIGHT TIME AS WELL AS THE PLL ERROR.
Tc = DISPLACEMENT OF CLKD/10 RELATIVE TO CLK D.
Td = THE SKEW BETWEEN CLK A AND CLK C. THIS SKEW IS A FUNCTION OF THE CLOCK DISTRIBUTION OF THE SYSTEM CLOCK AND CAN BE CONTROLLED.

IN ORDER TO MEET THE SET UP Tsu OF FF-B WE NEED: Tsu <= Tf - [Td + Ta + Tb + Tc + CLK TO Q(FF-A)].

SINCE ALL THE PARAMETERS IN THE ABOVE EQUATION ARE GIVEN OR CONTROLLED Tf OF THE SYSTEM CAN BE SELECTED TO MAKE SURE THAT WE CAN MEET Tsu AND THUS MOVE DATA ANY RISING EDGE OF THE CLOCK.

FIG. 3

SYNCHRONOUS PIPELINED SWITCH USING SERIAL TRANSMISSION

BACKGROUND OF THE INVENTION

1. Field of the Invention

This invention relates to communication switching.

2. Related Art

In switching in communication networks, one important feature is speed. It is generally desirable for switches in such networks to operate as quickly and with as little latency as possible. One method by which switches are known to operate quickly is to synchronously switch individual cells of messages; thus, each cell to be switched is the same length and the switch operates at the start of each cell time to transfer cells from assigned input queues to assigned output queues.

One problem in the known art is that, for the switch to operate on parallel data, it will require a very large number of incoming and outgoing communication paths for individual message bits. However, if the switch is at all sizable, this makes connectivity with the switch, and the switch backplane itself, extremely unwieldy and expensive. For example, to support 16 input queues and 16 output queues each operating at 3.2 gigabits per second, each interface to the interconnect would require a 64 bit bus operating at 50 MHz, totaling 2048 connectors for data alone. Control signal connectors and power connectors would add to this total.

Alternatively, for the switch to operate on serial data, the receiving output queues must recover clock signals from the data signals and synchronize to the transmitted clock signals as they are received. Synchronization to transmitted clock signals can be performed with a phase-locked loop (PLL). However, if the switch is at all rapid, the time required to synchronize will be a substantial fraction of the cell time for switching, and thus substantially increase the time overhead for switching.

Accordingly, it would be desirable to provide a method and system for rapidly synchronously switching large amounts of data, particularly in a cellbased switch. This advantage is achieved in an embodiment of the invention in which the switch interconnect operates a synchronously and serially, but appears to operate synchronously, by using a single clock signal source which is uniform for the switch interconnect and its input and output queues and thus accrues no synchronization delay.

SUMMARY OF THE INVENTION

The invention provides a method and system for operating a switch, in which incoming data cells are converted from parallel to serial for synchronous input to a switch interconnect, converted from serial to parallel for parallel switching, converted from parallel to serial for synchronous output from the switch interconnect, and converted to from serial to parallel for output. The switch interconnect and its input and output interfaces are controlled by a single frequency source, so that all serial data communication paths into and out of the switch interconnect are phase synchronized to within one clock cycle.

In a preferred embodiment, a single frequency source for the switch system is coupled to the input interfaces, to the output interfaces, and to the switch interconnect. The input interfaces each include a PLL which synchronizes to the single frequency source once for all serial communication to the switch interconnect. The switch interconnect includes one PLL for each input interface which synchronizes to the serial input from that input interface, and one PLL for each output interface which synchronizes to the single frequency source once for all serial communication to the output interface. Similarly, the output interfaces each include a PLL which synchronizes to the serial output from the switch interconnect. The switch interconnect is coupled to the single frequency source and operates in phase therewith.

BRIEF DESCRIPTION OF THE DRAWINGS

FIG. 3 shows a timing diagram of signals in an interconnect system having a single system frequency source.

DETAILED DESCRIPTION OF THE EMBODIMENT

In the following description, a preferred embodiment of the invention is described with regard to preferred process steps and data structures. Those skilled in the art would recognize after perusal of this application that embodiments of the invention can be implemented using circuitry or other elements adapted to particular process steps and data structures, and that implementation of the process steps and data structures described herein would not require undue experimentation or further invention.

Figure 1:
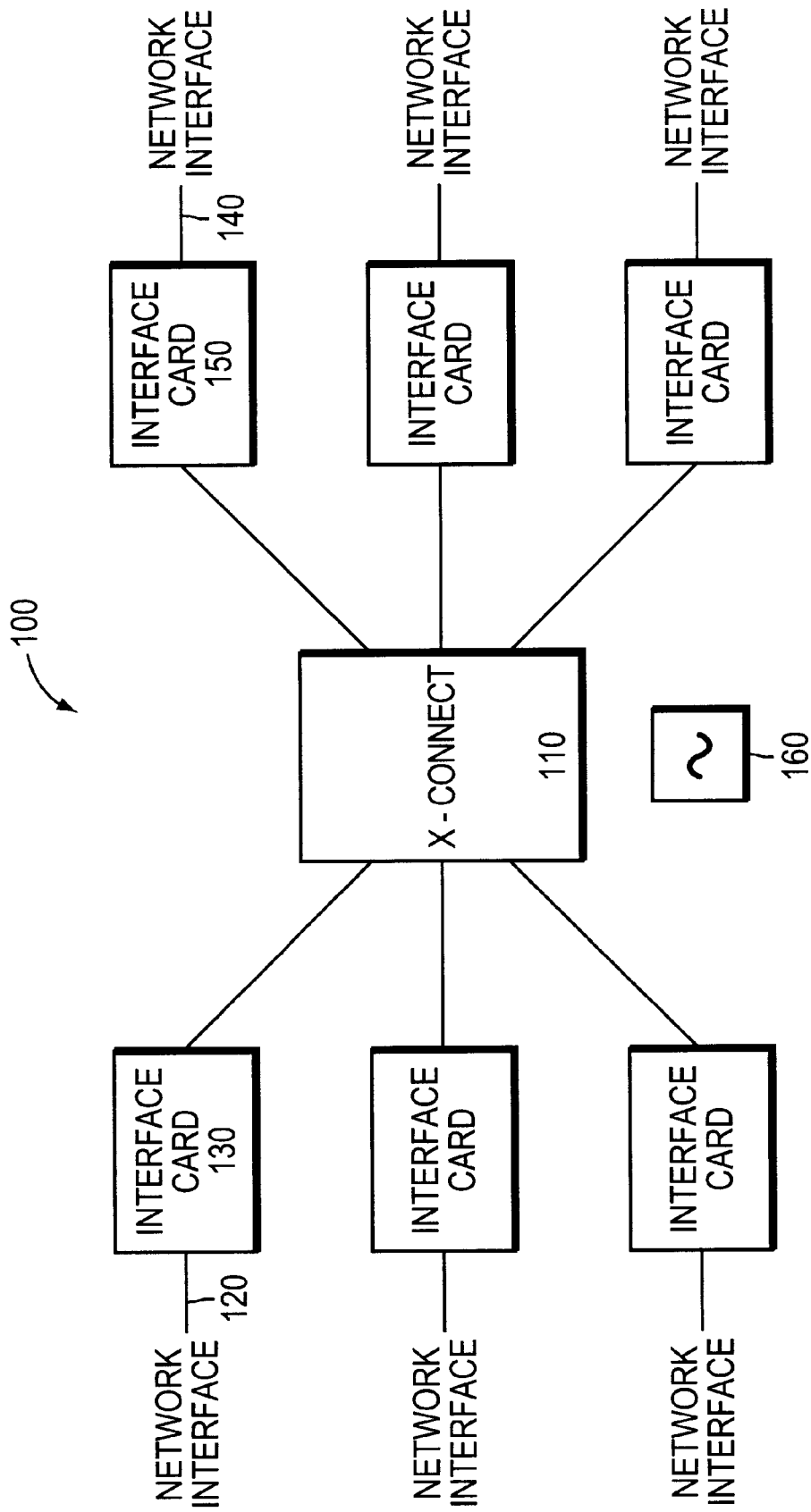
FIG. 1 shows a block diagram of an interconnect system.

FIG. 1 shows a block diagram of an interconnect system.

An interconnect system 100 includes a switch interconnect 110, a plurality of input ports 120, a plurality of input interfaces 130 each corresponding to at least one input port 120, a plurality of output ports 140, a plurality of output interfaces 150 each corresponding to at least one output port 140, and a single frequency source 160.

Incoming data is segmented into fixed size data cells and the system 100 provides the capability to switch those data cells by providing a connection for each input port 120 and to one (for unicast data cells) or more (for multicast data cells) selected output ports 140, for a single data cell duration. The switch interconnect 110, all input interfaces 130, and all output interfaces 150, are synchronized to the same data cell period using the single frequency source 160.

For example, in a preferred embodiment, the switch 100 provides the capability to switch ATM data cells having 53 bytes each according to the SONET OC-48 specification rate. The SONET OC-48 specification is known in the art of digital communication. There are sixteen input interfaces 120, each providing the capability to receive at least one data cell each 176 nanoseconds, each data cell having 53 words (5 words of header and 48 words of payload), each word having eight bits. Similarly, there are sixteen output interfaces 150, each providing the capability to transmit an identical data cell in the same time period. In a preferred embodiment, the switch 100 operates faster than the time taken by each of the input interfaces 120 to receive one 53-byte data cell, for example the switch 100 can have a switching time of about 128 nanoseconds per data cell.

In alternative embodiments, the system 100 may provide the capability to switch data cells according to other or further specifications, such as at the SONET OC-3 specification rate, in which ATM data cells having 53 bytes each are switched at least once each 2.8 microseconds, at the SONET OC-12 specification rate, in which ATM data cells having 53 bytes each are switched at least once each 704 nanoseconds, or other specifications which use data cells of other specified fixed sizes, such as other ATM or framebased specifications which may have different cell sizes and data rates. The SONET OC-3 specification and the SONET OC-12 specification are each known in the art of digital communication.

In further alternative embodiments, the system 100 may provide the capability to switch variable-length data, such as data packets which are repackaged as data cells (such as by splitting each data packet into one or more data cells). In such alternative embodiments, the system 100 may provide switching on only some, rather than all, data cell boundaries. PLL synchronization time is saved even when the system 100 switches variable-length data.

The switch interconnect 110 includes an input queued switch, in which each input interface 130 is matched at the beginning of each data cell time period with a set of output interfaces 150, corresponding to either a single output port 140 (for unicast data cells) or a to plurality of output ports 140 (for multicast data cells). Matching is performed under control of a switch control element (not shown). When an input interface 130 is matched with one or more output interfaces 150, data cells are transmitted from all the matched input interfaces 130 through the switch interconnect 110 and to all the matched output interfaces 150. Input queued switches are known in the art.

Incoming data cells are received from each input port 120 by each corresponding input interface 130 and converted from a parallel data format to a serial data format. The data cells are transmitted in the serial data format from each input interface 130 to the switch interconnect 110, where they are coupled to the selected one or more output interfaces 150 in the serial data format. Outgoing data cells are converted from the serial data format to the parallel data format and transmitted from each output interface 150 to one or more corresponding output ports 140.

In a preferred embodiment, the switch interconnect 110 receives the data cells from the input interfaces 130 in the serial data format, converts them to the parallel data format, switches them in the parallel data format using a cross-bar switch, and converts them back from the parallel data format to the serial data format for transmission to the output interfaces 150.

Figure 2:
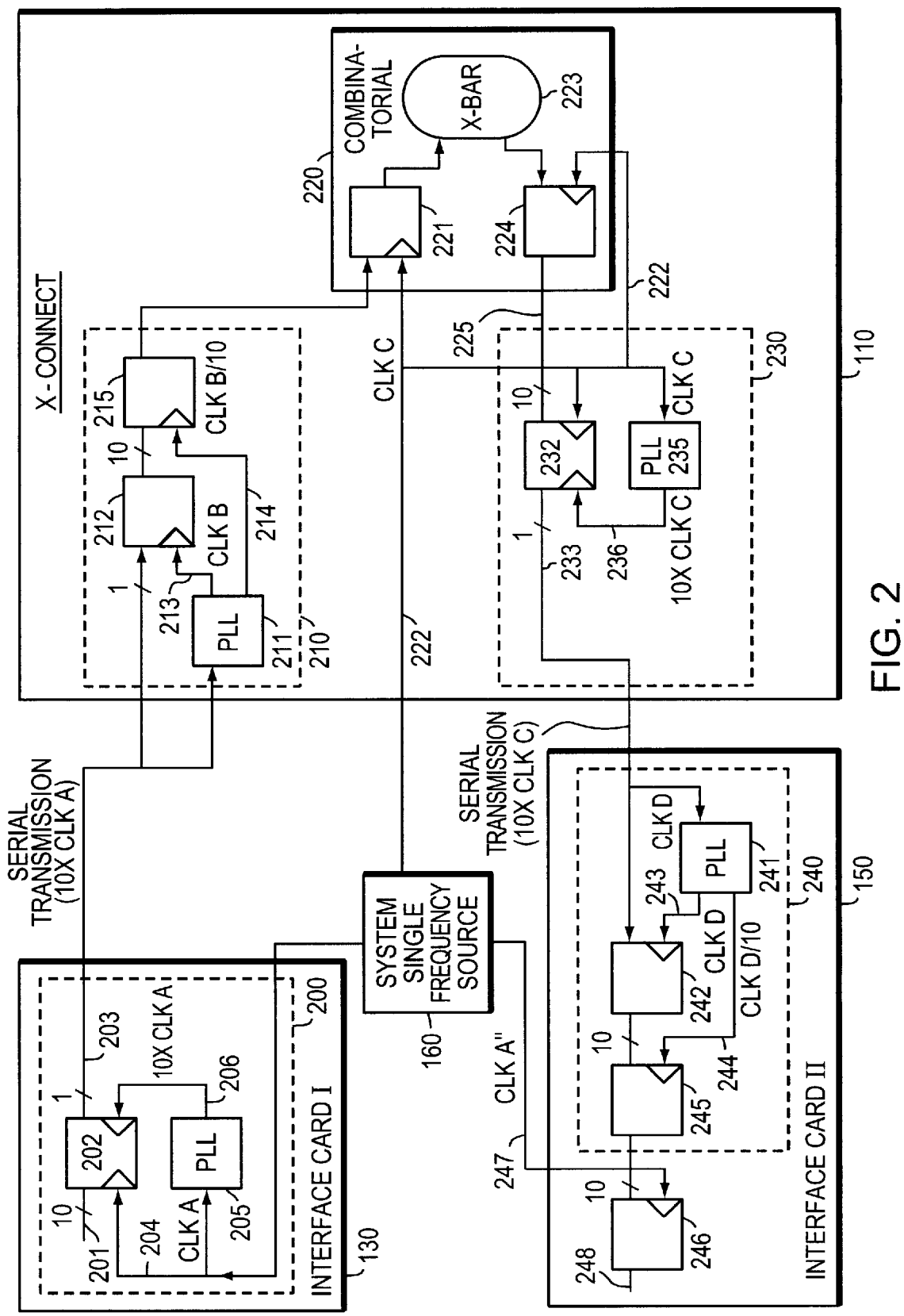
FIG. 2 shows a circuit diagram of an interconnect system having a single system frequency source.

FIG. 2 shows a circuit diagram of an interconnect system having a single system frequency source.

One of the input interfaces 130 is coupled to one of its corresponding input ports 120 using a parallel data path 201. The parallel data path 201 is ten bits wide and includes eight bits of payload data encoded using an 8B/10B code. The 8B/10B code is known in the art of parallel transmission of data.

The parallel data path 201 is coupled to a parallel-serial converter 200, including a shift register 202, which is itself coupled to a serial data path 203. The shift register 202 converts the data from the 10-bit wide, 1 clock cycle long (for each data word) parallel data format used on the parallel data path 201 to a 1 bit wide, 10 clock cycles long (for each data word) serial data format used on the serial data path 203.

The shift register 202 is clocked at a parallel input by a first clock signal 204 (clock A) from the single frequency source 160, for receiving parallel data from the parallel data path 201, and is clocked at a serial output by a second clock signal 206 (clock 10×A) from a PLL 205 for transmitting serial data to the serial data path 203. The second clock signal 206 (clock 10×A) is ten times the frequency as the first clock signal 204 (clock A), as might be expected for converting 10-bit wide parallel data to 1-bit wide serial data.

The PLL 205 is synchronized to the single frequency source 160. When the system 100 is powered-on, the single frequency source 160 generates its clock signal (clock A) and the PLL 205 for each input interface 130 synchronizes to that clock signal (clock A) preferably exactly once. After the PLL 205 synchronizes to the clock signal (clock A) from the single frequency source 160, it remains synchronized and there is no need thereafter for the PLL 205 to resynchronize.

The serial data path 203 is coupled to the switch interconnect 110, which receives the data cell in the serial data format and couples it to a serial parallel converter 210, including a PLL 211 and a serial-input- parallel-output shift register 212. The PLL 211 generates a first clock signal 213 (clock B) in response to the data words in the serial data format, and clocks the shift register 212 using the first clock signal 213 (clock B). Generating clock signals in response to data in a serial data format is known in the art of digital communication.

The PLL 211 also generates a second clock signal 214 (clock B/10) in response to the data words in the serial data format. The second clock signal 214 (clock B/10) is one-tenth the frequency as the first clock signal 213 (clock B), as might be expected for converting 1-bit wide serial data to 10-bit wide parallel data.

The PLL 211 is synchronized to the serial data path 203 and therefore also synchronized to the single frequency source 160. When the system 100 is powered-on, the single frequency source 160 generates its clock signal (clock A), the serial data path 203 is synchronized to that clock signal (clock A), and the PLL 211 for the switch interconnect 110 synchronizes to that serial data path 203 preferably exactly once. After the PLL 211 synchronizes to the serial data path 203, and therefore to the clock signal (clock A) from the single frequency source 160, it remains synchronized and there is no need thereafter for the PLL 211 to resynchronize.

The parallel output of the shift register 212 is coupled to a register (or latch) 215, which is clocked by the second clock signal 214 (clock B/10).

An output of the register 215 is coupled to a cross-bar switch 220. The cross-bar switch 220 includes an input register (or latch) 221, which is clocked by a first clock signal 222 from the single frequency source 160. The input register 221 is coupled to a combinatorial cross-bar 223. An output of the combinatorial cross-bar 223 is coupled to an output register (or latch) 224, which is also clocked by the first clock signal 222 from the single frequency source 160.

An output of the output register 224 is coupled via a parallel data path 225 to a parallel-serial converter 230, including a shift register 232, which is itself coupled to a serial data path 233. The shift register 232 converts data from the 10-bit wide, 1 clock cycle long (for each data word) parallel data format used on the parallel data path 225 to a 1-bit wide, 10 clock cycles long (for each data word) serial data format used on the serial data path 233.

The shift register 232 is clocked at a parallel input by the first clock signal 222 (clock C) from the single frequency source 160, for receiving parallel data from the parallel data path 225, and is clocked at a serial output by a second clock signal 236 (clock 10×C) from a PLL 235 for transmitting serial data to the serial data path 233. The second clock signal 236 (clock 10×C) is ten times the frequency as the first clock signal 222 (clock C), as might be expected for converting 10-bit wide parallel data to 1-bit wide serial data.

The PLL 235 is synchronized to the single frequency source 160. When the system 100 is powered-on, the single frequency source 160 generates its clock signal (clock C) and the PLL 235 for the switch interconnect 110 synchronizes to that clock signal (clock C) preferably exactly once. After the PLL 235 synchronizes to the clock signal (clock C) from the single frequency source 160, it remains synchronized and there is no need thereafter for the PLL 235 to resynchronize.

The serial data path 233 is coupled from the switch interconnect 110 to the output interface 150, which receives the data cell in the serial data format and couples it to a serial-parallel converter 240, including a PLL 241 and a serial-input parallel-output shift register 242. The PLL 241 generates a first clock signal 243 (clock D) in response to the data words in the serial data format, and clocks the shift register 242 using the first clock signal 243 (clock D).

The PLL 241 also generates a second clock signal 244 (clock D/10) in response to the data words in the serial data format. The second clock signal 244 (clock D/10) is one-tenth the frequency as the first clock signal 243 (clock D), as might be expected for converting 1-bit wide serial data to 10-bit wide parallel data.

The PLL 241 is synchronized to the serial data path 233 and therefore also synchronized to the single frequency source 160. When the system 100 is powered-on, the single frequency source 160 generates its clock signal (clock C), the serial data path 233 is synchronized to that clock signal (clock C), and the PLL 241 for the output interface 150 synchronizes to that serial data path 233 preferably exactly once. After the PLL 241 synchronizes to the serial data path 233, and therefore to the clock signal (clock C) from the single frequency source 160, it remains synchronized and there is no need thereafter for the PLL 241 to resynchronize.

The parallel output of the shift register 242 is coupled to a register (or latch) 245, which is clocked by the second clock signal 244 (clock D/10).

An output of the register 245 is coupled to an output port register (or latch) 246, which is clocked by a clock signal (clock A) 247 from the single frequency source 160. An output of the output port register 246 is coupled to one or more corresponding output ports 248.

FIG. 3 shows a timing diagram of signals in an interconnect system having a single system frequency source.

A clock signal 301 (clock A) is provided by the single frequency source 160, appears at the node 204, and has a period Tf 302, which is the inverse of its frequency.

A clock signal 303 (clock 10×A) appears at the node 206, and has a frequency ten times the frequency of the clock signal 301 (clock A). It is offset from the clock signal 301 (clock A) by a time period Ta 304, which is a time period from when data from the parallel data stream 201 is received at an input of the shift register 202 to when a first serial data bit is provided at an output of the shift register 202.

A clock signal 305 (clock B) appears at the node 213, and has a frequency equal to the clock signal 303 (clock 10×A). It is offset from the clock signal 303 (clock 10×A) by a time period Tb 306, which is a time period needed to transmit serial data in the serial data format from the input interface 130 to the switch interconnect 110 plus a phase delay introduced by the PLL 211.

A clock signal 307 (clock B/10) appears at the node 214, and has a frequency equal to the clock signal 301 (clock A). It is offset from the clock signal 305 (clock B) by a time period Tc 308, which is a displacement introduced by the PLL 211. Those skilled in the art will notice, after perusal of this application, that the time period Tc 308 might be either a positive or a negative time offset.

A clock signal 309 (clock C) appears at the node 222, and has a fre quency equal to the clock signal 301 (clock A). It is offset from the clock signal 301 (clock A) by a time period Td 310, which is a displacement introduced by distribution of clock signals from the single frequency source 160.

A time Tsu 311 must be greater than or equal to the set-up time required for registers in the system 100. The difference (Tf−Tsu), which is equal to the sum of offsets (Ta+Tb+Tc+Td), must therefore be greater or equal to the set-up time required for registers in the system 100, in order to move data between the shift register 202 and the input register 221 at the rising edge of each system clock (such as clock A and clock C). The actual set-up time required is responsive to the frequency at which the data is to be moved.

In a preferred embodiment, the time period Ta 304 is about 2 nanoseconds to about 3 nanoseconds, the time period Tb 306 is about 1.5 nanoseconds, the time period Tc 308 is about plus or minus 0.1 nanoseconds to 0.2 nanoseconds, the time period Td 310 is about 2 nanoseconds, and the time period Tsu is about 1 nanosecond to about 2 nanoseconds.

A time Th 312 must be greater than or equal to the hold time required for registers in the system 100, in order to move data as described herein.

In a preferred embodiment, the time period Th 312 need not be greater than about 0.1 nanoseconds.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A switch, comprising:

a clock signal source for generating a first clock signal;

at least one input interface element, said at least one input interface element having a parallel input port for receiving data cells and a serial transmitter coupled to said input port by a first parallel to serial converter, and transmitting said data cells by serial transmission;

a cross connect receiving serial data from said at least one input interface element at a first serial to parallel converter, said cross connect having a cross bar switch receiving parallel data from the first serial to parallel converter, and said cross connect having a second parallel to serial converter receiving parallel data from the cross bar switch and transmitting the data by serial transmission;

at least one output interface element receiving said serial data, transmitted by said cross connect, at a second serial to parallel converter and an output port receiving parallel data from said second serial to parallel converter and transmitting parallel data;

means for generating a second clock signal in response to the first clock signal, said second clock signal for synchronizing said first serial to parallel converter to said first clock signal;

means for generating a third clock signal in response to the first clock signal, said third clock signal for synchronizing said first parallel to serial converter to said first clock signal;

means for generating a fourth clock signal in response to the first clock signal, said fourth clock signal for synchronizing said second parallel to serial converter to said first clock signal; and, means for generating a fifth clock signal in response to the first clock signal, said fifth clock signal for synchronizing said second serial to parallel converter to said first clock signal.

2. A switch, comprising:

a clock signal source for generating a first clock signal;

at least one input interface element, said at least one input interface element having a parallel input port for receiving data cells and a serial transmitter coupled to said input port by a first parallel to serial converter, and transmitting said data cells by serial transmission;

a cross connect receiving serial data from said at least one input interface element at a first serial to parallel converter, said cross connect having a cross bar switch receiving parallel data from the first serial to parallel converter, and said cross connect having a second parallel to serial converter receiving parallel data from the cross bar switch and transmitting the data by serial transmission;

at least one output interface element receiving said serial data, transmitted by said cross connect, at a second serial to parallel converter and an output port receiving parallel data from said second serial to parallel converter and transmitting parallel data;

a first phase locked loop to generate a second clock signal in response to the first clock signal, said second clock signal for synchronizing said first serial to parallel converter to said first clock signal;

a second phase locked loop to generate a third clock signal in response to the first clock signal, said third clock signal for synchronizing said first parallel to serial converter to said first clock signal;

a third phase locked loop to generate a fourth clock signal in response to the first clock signal, said fourth clock signal for synchronizing said second parallel to serial converter to said first clock signal; and, a fourth phase locked loop to generate a fifth clock signal in response to the first clock signal, said fifth clock signal for synchronizing said second serial to parallel converter to said first clock signal.

3. A switch comprising:

a clock signal source generating a first clock signal;

a plurality of input interface elements, each input interface element receiving parallel data and converting said parallel data to serial data by a first parallel to serial converter for transmission to a cross connect as serial data;

a first serial to parallel converter in said cross connect, said first serial to parallel converter receiving said serial data and converting it to parallel data for a cross bar switch is in said cross connect;

a second parallel to serial converter in said cross connect, said second parallel to serial converter receiving parallel data from said cross bar switch and converting it into serial data for transmission to an output interface element;

a second serial to parallel converter in said output interface unit, said second serial to parallel converter receiving serial data from said cross connect and converting it into parallel data for transmission as parallel data by an output port in said output interface unit;

means for generating a second clock signal in response to the first clock signal, said second clock signal for synchronizing said first serial to parallel converter to said first clock signal;

means for generating a third clock signal in response to the first clock signal, said third clock signal for synchronizing said first parallel to serial converter to said first clock signal;

means for generating a fourth clock signal in response to the first clock signal, said fourth clock signal for synchronizing said second parallel to serial converter to said first clock signal; and, means for generating a fifth clock signal in response to the first clock signal, said fifth clock signal for synchronizing said second serial to parallel converter to said first clock signal.

4. A switch comprising:

a clock signal source generating a first clock signal;

a plurality of input interface elements, each input interface element receiving parallel data and converting said parallel data to serial data by a first parallel to serial converter for transmission to a cross connect as serial data;

a first serial to parallel converter in said cross connect, said first serial to parallel converter receiving said serial data and converting it to parallel data for a cross bar switch in said cross connect;

a second parallel to serial converter in said cross connect, said second parallel to serial converter receiving parallel data from said cross bar switch and converting it into serial data for transmission to an output interface element;

a second serial to parallel converter in said output interface unit, said second serial to parallel converter receiving serial data from said cross connect and converting it into parallel data for transmission as parallel data by an output port in said output interface unit;

a first phase locked loop to generate a second clock signal in response to the first clock signal, said second clock signal for synchronizing said first serial to parallel converter to said first clock signal;

a second phase locked loop to generate a third clock signal in response to the first clock signal, said third clock signal for synchronizing said first parallel to serial converter to said first clock signal;

a third phase locked loop to generate a fourth clock signal in response to the first clock signal, said fourth clock signal for synchronizing said second parallel to serial converter to said first clock signal; and, a fourth phase locked loop to generate a fifth clock signal in response to the first clock signal, said fifth clock signal for synchronizing said second serial to parallel converter to said first clock signal.

5. A switch comprising:

a clock signal source generating a first clock signal;

a plurality of input interface elements, each input interface element receiving parallel data and converting said parallel data to serial data by a first parallel to serial converter for transmission to a cross connect as serial data;

a first serial to parallel converter in said cross connect, said first serial to parallel converter receiving said serial data and converting it to parallel data for a cross bar switch in said cross connect;

a second parallel to serial converter in said cross connect, said second parallel to serial converter receiving parallel data from said cross bar switch and converting it into serial data for transmission to an output interface element;

a second serial to parallel converter in said output interface unit, said second serial to parallel converter receiving serial data from said cross connect and converting it into parallel data for transmission as parallel data by an output port in said output interface unit;

means for generating a second clock signal in response to the first clock signal, said second clock signal for synchronizing said first serial to parallel converter to said first clock signal;

means for generating a third clock signal in response to the first clock signal, said third clock signal for synchronizing said first parallel to serial converter to said first clock signal;

means for generating a fourth clock signal in response to the first clock signal, said fourth clock signal for synchronizing said second parallel to serial converter to said first clock signal; and, means for generating a fifth clock signal in response to the first clock signal, said fifth clock signal for synchronizing said second serial to parallel converter to said first clock signal.

6. A switch, comprising:

a clock signal source for generating a first clock signal;

a plurality of input interface elements, each said input interface element including (1) a parallel input port receiving data cells, and (2) a serial transmitter coupled to said input port and synchronized to said source and transmitting said data cells by serial transmission;

a plurality of output interface elements, each said output interface element including (1) a parallel output port, and (2) a serial receiver coupled to said output port and synchronized to said source; and a cross connect receiving serial data from a selected input interface element of said plurality of input interface elements at an input serial to parallel converter, said cross connect having a cross bar switch receiving parallel data from the input serial to parallel converter, and said cross connect having an output parallel to serial converter receiving parallel data from the cross bar switch and transmitting the data by serial transmission to a selected output interface of said plurality of output interface elements;

a first phase locked loop generating a second clock signal in response to the first clock signal for generating serial data from the parallel data arriving at said selected input interface element, the serial data coupled by serial transmission to the serial to parallel converter of the cross connect; and, a second phase locked loop generating a third clock signal in response to the first clock signal, the third clock signal for operating the serial to parallel converter of the cross connect to provide parallel data to the cross bar switch, to synchronize the serial to parallel converter and parallel to serial converter to the first clock signal.

7. The switch of claim 6 further comprising:

a third phase locked loop generating a fourth clock signal in response to the first clock signal, to operate the output parallel to serial converter, the output parallel to serial converter receiving parallel data from the cross bar switch for serial transmission to an output interface element; and, a fourth phase locked loop generating a fifth clock signal in response to the first clock signal, to generate parallel data from the serial data received by the output interface element from the cross connect.

8. A switch, comprising:

a clock signal source for generating a first clock signal;

a plurality of input interface elements, each said input interface element including (1) a parallel input port, and (2) a serial transmitter coupled to said input port and transmitting data cells by serial transmission;

a plurality of output interface elements, each said output interface element including (1) a parallel output port, and (2) a serial receiver coupled to said output port; and, a cross connect receiving serial data from a selected input interface element of said plurality of input interface elements at an input serial to parallel converter, said cross connect having a cross bar switch receiving parallel data from the input serial to parallel converter, and said cross connect having an output parallel to serial converter receiving parallel data from the cross bar switch and transmitting the data by serial transmission to an output interface;

means for generating a second clock signal in response to the first clock signal for generating serial data from the parallel data arriving at an input interface element of the plurality of input interface elements, the serial data coupled by serial transmission to the serial to parallel converter of the cross connect; and, means for generating a third clock signal in response to the first clock signal, the third clock signal for operating the serial to parallel converter of the cross connect to provide parallel data to the cross bar switch, and to synchronize the serial to parallel converters and the parallel to serial converters to the first clock signal.

9. A method of operating a switch, comprising:

generating a first clock signal;

receiving data cells as parallel data at an input port, coupling the parallel data to a first parallel to serial converter, and transmitting said data cells by serial transmission to a cross connect;

receiving by said cross connect said data cells as serial data, coupling said serial data to a first serial to parallel converter, coupling parallel data from said first serial to parallel converter to a cross bar switch, coupling parallel data from said cross bar switch to a second parallel to serial converter, and transmitting the data by serial transmission to at least one output interface;

receiving serial data by said at least one output interface, said serial data coupled to a second serial to parallel converter located in said output interface, and delivering parallel data by said second serial to parallel converter to an output port of said output interface;

generating a second clock signal in response to the first clock signal, said second clock signal for synchronizing said first serial to parallel converter to said first clock signal;

generating a third clock signal in response to the first clock signal, said third clock signal for synchronizing said first parallel to serial converter to said first clock signal;

generating a fourth clock signal in response to the first clock signal, said fourth clock signal for synchronizing said second parallel to serial converter to said first clock signal; and, generating a fifth clock signal in response to the first clock signal, said fifth clock signal for synchronizing said second serial to parallel converter to said first clock signal.

10. A method of operating a switch, comprising:

generating a first clock signal;

receiving data cells by a plurality of input interface elements, each said input interface element including (1) a parallel input port, and (2) a serial transmitter coupled to said input port;

transmitting data cells by a plurality of output interface elements, each said output interface element including (1) a parallel output port, and (2) a serial receiver coupled to said output port;

receiving serial data by a cross connect from an input interface element of said plurality of input interface elements, coupling the serial data to an input serial to parallel converter, said cross connect having a cross bar switch receiving parallel data from the input serial to parallel converter, and said cross connect having an output parallel to serial converter receiving parallel data from the cross bar switch and transmitting the data by serial transmission to a selected output interface of said plurality of output interface elements;

generating a second clock signal by a first phase locked loop in response to the first clock signal, for generating serial data from the parallel data arriving at an input interface element of the plurality of input interface elements, the serial data coupled by serial transmission to the serial to parallel converter of the cross connect; and, generating a third clock signal by a second phase locked loop in response to the first clock signal, the third clock signal for operating the serial to parallel converter of the cross connect to provide parallel data to the cross bar switch, and to synchronize the serial to parallel converters and the parallel to serial converters to the first clock signal.

11. The method of operating a switch of claim 10 further comprising:

generating a fourth clock signal by a third phase locked loop in response to the first clock signal, to operate the output parallel to serial converter, the output parallel to serial converter receiving parallel data from the cross bar switch for serial transmission to an output interface element; and, generating a fifth clock signal by a fourth phase locked loop in response to the first clock signal, to generate parallel data from the serial data received by the output interface element from the cross connect.

* * * * *

UNITED STATES PATENT AND TRADEMARK OFFICE
CERTIFICATE OF CORRECTION

PATENT NO. : 6,424,649 B1
DATED : July 23, 2002
INVENTOR(S) : Michael Laor et al.

It is certified that error appears in the above-identified patent and that said Letters Patent is hereby corrected as shown below:

<u>Title page,</u>
Item [56], References Cited, U.S. PATENT DOCUMENTS, insert the following references:

--

| Number | Name | Date |
|---|---|---|
| Re. 33, 900 | Howson | Apr-92 |
| 5,903,559 | Acharya et al. | May-99 |
| 5,898,686 | Virgile | Apr-99 |
| 5,856,981 | Voelker | Jan-99 |
| 5,854,903 | Morrison et al. | Dec-98 |
| 5,835,710 | Nagami et al. | Nov-98 |
| 5,802,054 | Bellenger | Sep-98 |
| 5,754,547 | Nakazawa | May-98 |
| 5,748,617 | McLain, Jr. | May-98 |
| 5,748,186 | Raman | May-98 |
| 5,724,351 | Chao et al. | Mar-98 |
| 5,697,390 | Yamato et al. | Dec-97 |
| 5,689,506 | Chiussi et al. | Nov-97 |
| 5,687,324 | Green et al. | Nov-97 |
| 5,684,797 | Azner et al. | Nov-97 |
| 5,680,116 | Hashimoto et al. | Oct-97 |
| 5,678,006 | Valizadeh et al. | Oct-97 |
| 5,673,265 | Gupta et al. | Sep-97 |
| 5,666,353 | Klausmeier et al. | Sep-97 |
| 5,659,684 | Giovannoni et al. | Aug-97 |
| 5,644,718 | Belove et al. | Jul-97 |
| 5,638,359 | Peltola et al. | Jun-97 |
| 5,634,010 | Ciscon et al. | May-97 |
| 5,632,021 | Jennings et al. | May-97 |
| 5,631,908 | Saxe | May-97 |
| 5,630,125 | Zellweger | May-97 |
| 5,617,421 | Chin et al. | Apr-97 |
| 5,617,417 | Sathe et al. | Apr-97 |
| 5,608,726 | Virgile | Mar-97 |
| 5,604,868 | Komine et al. | Feb-97 |
| 5,600,798 | Cherukuri et al. | Feb-97 |
| 5,598,581 | Daines et al. | Jan-97 |
| 5,592,470 | Rudrapatna et al. | Jan-97 |
| 5,583,862 | Callon | Dec-96 |
| 5,561,669 | Lenney et al. | Oct-96 |
| 5,555,244 | Gupta et al. | Sep-96 |
| 5,546,370 | Ishikawa | Aug-96 |
| 5,541,911 | Nilakantan et al. | Jul-96 |
| 5,539,734 | Burwell et al. | Jul-96 |
| 5,535,195 | Lee | Jul-96 |
| 5,530,963 | Moore et al. | Jun-96 |
| 5,526,489 | Nilakantan et al. | Jun-96 |
| 5,519,704 | Farinacci et al. | May-96 |
| 5,517,494 | Green | May-96 |
| 5,509,006 | Wilford et al. | Apr-96 |
| 5,504,747 | Sweasey | Apr-96 |
| 5,497,368 | Reijnierse et al. | Mar-96 |
| 5,491,804 | Heath et al. | Feb-96 |
| 5,491,687 | Christensen et al. | Feb-96 |
| 5,490,258 | Fenner | Feb-96 |
| 5,490,140 | Abensour et al. | Feb-96 |
| 5,485,455 | Dobbins et al. | Jan-96 |
| 5,477,541 | White et al. | Dec-95 |
| 5,473,607 | Hausman et al. | Dec-95 |
| 5,473,599 | Li et al. | Dec-95 |

UNITED STATES PATENT AND TRADEMARK OFFICE
CERTIFICATE OF CORRECTION

PATENT NO. : 6,424,649 B1
DATED : July 23, 2002
INVENTOR(S) : Michael Laor et al.

It is certified that error appears in the above-identified patent and that said Letters Patent is hereby corrected as shown below:

| | | |
|---|---|---|
| 5,452,297 | Hiller et al. | Sep-95 |
| 5,442,630 | Gagliardi et al. | Aug-95 |
| 5,442,457 | Najafi | Aug-95 |
| 5,430,729 | Rahnema | Jul-95 |
| 5,430,715 | Corbalis et al. | Jul-95 |
| 5,428,607 | Hiller et al. | Jun-95 |
| 5,426,636 | Hiller et al. | Jun-95 |
| 5,423,002 | Hart | Jun-95 |
| 5,422,882 | Hiller et al. | Jun-95 |
| 5,422,880 | Heitkamp et al. | Jun-95 |
| 5,416,842 | Aziz | May-95 |
| 5,408,469 | Opher et al. | Apr-95 |
| 5,400,325 | Chatwani et al. | Mar-95 |
| 5,394,402 | Ross | Feb-95 |
| 5,394,394 | Crowther et al. | Feb-95 |
| 5,390,175 | Hiller et al. | Feb-95 |
| 5,390,170 | Sawant et al. | Feb-95 |
| 5,386,567 | Lien et al. | Jan-95 |
| 5,371,852 | Attanasio et al. | Dec-94 |
| 5,367,517 | Cidon et al. | Nov-94 |
| 5,365,524 | Hiller et al. | Nov-94 |
| 5,361,259 | Hunt et al. | Nov-94 |
| 5,361,256 | Doeringer et al. | Nov-94 |
| 5,361,250 | Nguyen et al. | Nov-94 |
| 5,359,592 | Corbalis et al. | Oct-94 |
| 5,345,446 | Hiller et al. | Jun-94 |
| 5,345,445 | Hiller et al. | Sep-94 |
| 5,331,637 | Francis et al. | Jul-94 |
| 5,327,421 | Hiller et al. | Jul-94 |
| 5,319,644 | Liang | Jun-94 |
| 5,317,562 | Nardin et al. | May-94 |
| 5,313,582 | Hendel et al. | May-94 |
| 5,313,454 | Bustini et al. | May-94 |
| 5,311,509 | Heddes et al. | May-94 |
| 5,307,343 | Bostica et al. | Apr-94 |
| 5,305,311 | Lyles | Apr-94 |
| 5,291,482 | McHarg et al. | Mar-94 |
| 5,287,453 | Roberts | Feb-94 |
| 5,287,103 | Kasprzyk et al. | Feb-94 |
| 5,283,783 | Nguyen et al. | Feb-94 |

UNITED STATES PATENT AND TRADEMARK OFFICE
CERTIFICATE OF CORRECTION

PATENT NO. : 6,424,649 B1  
DATED : July 23, 2002  
INVENTOR(S) : Michael Laor et al.

Page 3 of 6

It is certified that error appears in the above-identified patent and that said Letters Patent is hereby corrected as shown below:

| | | |
|---|---|---|
| 5,280,500 | Mazzola et al. | Jan-94 |
| 5,280,480 | Pitt et al. | Jan-94 |
| 5,280,470 | Buhrke et al. | Jan-94 |
| 5,274,643 | Fisk | Dec-93 |
| 5,274,635 | Rahman et al. | Dec-93 |
| 5,274,631 | Bhardwaj | Dec-93 |
| 5,271,004 | Proctor et al. | Dec-93 |
| 5,268,900 | Hluchyj et al. | Dec-93 |
| 5,268,592 | Bellamy et al. | Dec-93 |
| 5,260,978 | Fleischer et al. | Nov-93 |
| 5,260,933 | Rouse | Nov-93 |
| 5,255,291 | Holden et al. | Oct-93 |
| 5,253,251 | Aramaki | Oct-93 |
| 5,249,178 | Kurano et al. | Sep-93 |
| 5,247,516 | Bernstein et al. | Sep-93 |
| 5,243,596 | Port et al. | Sep-93 |
| 5,243,342 | Kattemalalavadi et al. | Sep-93 |
| 5,241,682 | Bryant et al. | Aug-93 |
| 5,237,564 | Lespagnol et al. | Aug-93 |
| 5,229,994 | Balzano et al. | Jul-93 |
| 5,228,062 | Bingham | Jul-93 |
| 5,226,120 | Brown et al. | Jul-93 |
| 5,224,099 | Corbalis et al. | Jun-93 |
| 5,212,686 | Joy et al. | May-93 |
| 5,208,811 | Kashio et al. | May-93 |
| 5,206,886 | Bingham | Apr-93 |
| 5,199,049 | Wison | Mar-93 |
| 5,166,930 | Braff et al. | Nov-92 |
| 5,136,580 | Videlock et al. | Aug-92 |
| 5,128,945 | Enns et al. | Jul-92 |
| 5,115,431 | Williams et al. | May-92 |
| 5,095,480 | Fenner | Mar-92 |
| 5,088,032 | Bosack | Feb-92 |
| 5,072,449 | Enns et al. | Dec-91 |
| 5,059,925 | Weisbloom | Oct-91 |
| 5,054,034 | Hughes-Hartogs | Oct-91 |
| 5,033,076 | Jones et al. | Jul-91 |
| 5,020,058 | Holden et al. | May-91 |
| 5,014,265 | Hahne et al. | May-91 |
| 5,003,595 | Collins et al. | Mar-91 |
| 4,991,169 | Davis et al. | Feb-91 |
| 4,980,897 | Decker et al. | Dec-90 |

UNITED STATES PATENT AND TRADEMARK OFFICE
CERTIFICATE OF CORRECTION

PATENT NO. : 6,424,649 B1
DATED : July 23, 2002
INVENTOR(S) : Michael Laor et al.

It is certified that error appears in the above-identified patent and that said Letters Patent is hereby corrected as shown below:

| | | |
|---|---|---|
| 4,970,678 | Sladowski et al. | Nov-90 |
| 4,965,772 | Daniel et al. | Oct-90 |
| 4,962,532 | Kasirai et al. | Oct-90 |
| 4,962,497 | Ferenc et al. | Oct-90 |
| 4,960,310 | Chushing | Oct-90 |
| 4,933,937 | Konishi | Jun-90 |
| 4,922,486 | Lidinsky et al. | May-90 |
| 4,903,261 | Baran et al. | Feb-90 |
| 4,893,306 | Chao et al. | Jan-90 |
| 4,879,551 | Georgiou et al. | Nov-89 |
| 4,835,737 | Herrig, et al. | May-89 |
| 4,833,706 | Hughes-Hartogs | May-89 |
| 4,827,411 | Arrowood et al. | May-89 |
| 4,819,228 | Baran et al. | Apr-89 |
| 4,771,425 | Baran et al. | Sep-88 |
| 4,769,811 | Eckberg, Jr. et al. | Sep-88 |
| 4,769,810 | Eckberg, Jr. et al. | Sep-88 |
| 4,763,191 | Gordon et al. | Aug-88 |
| 4,757,495 | Decker et al. | Jul-88 |
| 4,750,136 | Arpin et al. | Jun-88 |
| 4,731,816 | Hughes-Hartogs | Mar-88 |
| 4,723,267 | Jones et al. | Feb-88 |
| 4,679,227 | Hughes-Hartogs | Jul-87 |
| 4,679,189 | Olson et al. | Jul-87 |
| 4,677,423 | Benvenuto et al. | Jun-87 |
| 4,646,287 | Larson et al. | Feb-87 |
| 4,644,532 | George et al. | Feb-87 |
| 4,532,626 | Flores et al. | Jul-85 |
| 4,507,760 | Fraser | Mar-85 |
| 4,506,358 | Montgomery | Mar-85 |
| 4,499,576 | Fraser | Feb-85 |
| 4,464,658 | Thelen | Aug-84 |
| 4,456,957 | Schieltz | Jun-84 |
| 4,446,555 | Devault et al. | May-84 |
| 4,445,213 | Baugh et al. | Apr-84 |
| 4,439,763 | Limb | Mar-84 |
| 4,438,511 | Baran | Mar-84 |
| 4,437,087 | Petr | Mar-84 |
| 4,424,565 | Larson | Jan-84 |
| 4,419,728 | Larson | Dec-83 |

UNITED STATES PATENT AND TRADEMARK OFFICE
CERTIFICATE OF CORRECTION

PATENT NO. : 6,424,649 B1
DATED : July 23, 2002
INVENTOR(S) : Michael Laor et al.

It is certified that error appears in the above-identified patent and that said Letters Patent is hereby corrected as shown below:

```
4,397,020    Howson           Aug-83
4,316,284    Howson           Feb-82
4,161,719    Parikh et al.    Jul-79
4,131,767    Weinstein        Dec-78
```

FOREIGN PATENT DOCUMENTS

```
WO93/07569    Harriman et al.      Apr-93
WO93/07692    Harriman             Apr-93
WO94/01828    Bialkowski et al.    Jan-94
WO95/20850    Dobbins et al.       Aug-95
0 384 758 A2  Katsube              Aug-90
0 431 751 A1  Carter et al.        Jun-91
0 567 217 A2  Hart                 Oct-93
```

OTHER PUBLICATIONS

1  ALLEN, M., "Novell IPX Over Various WAN Media (IPXW AN)," Network Working Group, RFC 1551, December 1993, pp. 1-22.

2  BECKER, D., "3c589.c: A 3c589 EhterLink3 ethernet driver for linux," becker@CESDIS.gsfc.nasa.gov, May 3, 1994, pp. 1-13.

3  CHOWDHURY, ET AL., "Alternative Bandwidth Allocation Algorithms for Packet Video in ATM Networks," INFOCOM 1992, pp. 1061-1068.

4  DOERINGER, W., "Routing on Longest-Matching Prefixes," IEEE/ACM Transactions in Networking, Vol. 4, No. 1, February 1996, pp. 86-97.

5  ESAKI, ET AL., "Datagram Delivery in an ATM-Internet," 2334b IEICE Transactions on Communications, March 1994, No. 3, Tokyo, Japan.

6  IBM CORPORATION, "Method and Apparatus for the Statistical Multiplexing of Voice, Data and Image Signals," IBM Technical Disclosure Bulletin, No. 6, November 1992, pp. 409-411.

7  PEI, ET AL., "Putting Routing Tables in Silicon," IEEE Network Magazine, January 1992, pp. 42-50.

8  PERKINS, D., "Requirements for an Internet Standard Point-to-Point Protocol," Network Working Group, RFC 1547, December 1993, pp. 1-19.

9  SIMPSON, W., "The Point-to-Point Protocol (PPP)," Network Working Group, RFC 1548, December 1993, pp. 1-53.

10  TSUCHIYA, P.F., "A Search Algorithm for Table Entries with Non-Contiguous Wildcarding," Abstract, Bellcore.

11  ZHANG, ET AL., "Rate-Controlled Static-Priority Queuing," INFOCOM 1993, pp. 227-236.

UNITED STATES PATENT AND TRADEMARK OFFICE
CERTIFICATE OF CORRECTION

PATENT NO. : 6,424,649 B1
DATED : July 23, 2002
INVENTOR(S) : Michael Laor et al.

It is certified that error appears in the above-identified patent and that said Letters Patent is hereby corrected as shown below:

```
12   WILLIAM STALLINGS, Data and Computer Communications, PP: 329-
333, Prentice-Hall, Upper Saddle River, New Jersey 07458. --
```

Signed and Sealed this

Twentieth Day of July, 2004

JON W. DUDAS
*Acting Director of the United States Patent and Trademark Office*